(12) United States Patent
Li et al.

(10) Patent No.: US 9,237,178 B2
(45) Date of Patent: Jan. 12, 2016

(54) COMBINED BINARY STRING FOR SIGNALING BYTE RANGE OF MEDIA FRAGMENTS IN ADAPTIVE STREAMING

(75) Inventors: Hongbing Li, Belle Mead, NJ (US); Ye-Kui Wang, Bridgewater, NJ (US); Peng Zhang, Shenzhen (CN); Yunchao Gao, Shenzhen (CN); Hong Heather Yu, West Windsor, NJ (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 871 days.

(21) Appl. No.: 13/015,237

(22) Filed: Jan. 27, 2011

(65) Prior Publication Data
US 2011/0196981 A1    Aug. 11, 2011

Related U.S. Application Data

(60) Provisional application No. 61/300,992, filed on Feb. 3, 2010.

(51) Int. Cl.
*H04L 29/06* (2006.01)

(52) U.S. Cl.
CPC ............... *H04L 65/607* (2013.01); *H04L 65/60* (2013.01); *H04L 65/608* (2013.01); *H04L 65/80* (2013.01)

(58) Field of Classification Search
CPC ..... H04L 65/60; H04L 65/608; H04L 65/607; H04L 65/80; H04L 65/4084
USPC ............... 709/213–237; 370/229; 725/87, 89; 386/243
See application file for complete search history.

(56) References Cited

U.S. PATENT DOCUMENTS

| | | | |
|---|---|---|---|
| 2007/0130498 A1* | 6/2007 | Hannuksela | G11B 27/005 715/234 |
| 2007/0153918 A1* | 7/2007 | Rodriguez | H04N 5/76 375/240.29 |
| 2007/0162611 A1* | 7/2007 | Yu | G06Q 30/0242 709/232 |
| 2008/0010658 A1* | 1/2008 | Abbott | H04N 7/17318 725/87 |
| 2009/0222442 A1* | 9/2009 | Houh | G06F 17/30247 1/1 |
| 2009/0232220 A1* | 9/2009 | Neff | H04N 21/235 375/240.21 |
| 2009/0257500 A1* | 10/2009 | Karczewicz | H04N 19/00739 375/240.16 |
| 2009/0282444 A1* | 11/2009 | Laksono | H04N 7/17336 725/89 |
| 2010/0158101 A1* | 6/2010 | Wu | H04N 21/23424 375/240.01 |
| 2010/0180012 A1* | 7/2010 | Heo | H04L 65/1069 709/219 |
| 2011/0023076 A1* | 1/2011 | Park | H04N 21/44209 725/116 |
| 2011/0052146 A1* | 3/2011 | Murthy | H04N 7/17318 386/243 |
| 2011/0268178 A1* | 11/2011 | Park | H04N 21/23439 375/240.02 |

OTHER PUBLICATIONS

Zhang Lu et al., A method for storage and transport of embedded rich media application, Jan. 18-20, 2009, IEEE, pp. 1-4.*

(Continued)

*Primary Examiner* — Luu Pham
*Assistant Examiner* — Fahimeh Mohammadi
(74) *Attorney, Agent, or Firm* — Slater & Matsil, L.L.P.

(57) ABSTRACT

A system and method for providing media streaming are provided. A media description file having a range string indicator is used to specify location offsets of a plurality of media fragments within a media file. The range string may be stored directly in the media description file or the media description file may contain an indicator specifying a file containing the range string. The media description file may also include a range unit specifying the size of the offsets in the range string. In an embodiment, offsets within the individual media fragments may also be provided, either in the media description file or in a different file.

23 Claims, 10 Drawing Sheets

| 16 bits | 16 bits | 16 bits | | 16 bits | 16 bits |
|---|---|---|---|---|---|
| Frag_1 Start Offset | Frag_1 End Offset | Frag_2 Start Offset | ... | Frag_n Start Offset | Frag_n End Offset |

(56) References Cited

OTHER PUBLICATIONS

Julien Signes et al., MPEG-4's binary format for scene description, Jan. 2000, ScienceDirect, vol. 15, Issues 4-5, pp. 321-345.*

Christian Timmerer et al., An Evaluation of Existing Metadata Compression and Encoding Technologies for MPEG-21 Applications, Dec. 12-14, 2005, IEEE, pp. 1-6.*

Xian-Sheng Hua et al., Automatic Location of Text in Video Frames, 2001, ACM, pp. 24-27.*

"Technical Overview of Move Networks Implementation," Move Networks, Inc., Jan. 1, 2011, pp. 1-32.

Pantos, R., et al., "HTTP Live Streaming," IETF Internet-Draft, Nov. 19, 2010, pp. 1-22.

Yoshimura, T., et al., "Mobile Streaming Media CDN Enabled by Dynamic SMIL," WWW2002, May 7-11, 2002, pp. 1-19, Honolulu, HW.

Zambelli, A., "IIS Smooth Streaming Techinical Overview," Microsoft, Inc., Mar. 2009, pp. 1-17.

* cited by examiner

```
<switch>
  <video src="aaaa" systemBitrate="xxxx" systemScreenSize="yyyy"
  ::
    <param name="byteRangeUnit" value="[16|32|64]" valuetype="data" />
    <param name="byteRangeString" value="1234..." valuetype="data" />
  </video>
  ::
```

Fig. 2

```
<switch>
  <video src="aaaa" systemBitrate="xxxx" systemScreenSize="yyyy"
  ...
    <param name="byteRangeUnit" value="[16|32|64]" valuetype="data" />
    <param name="byteRangeInline" value="1" valuetype="data" />
    <param name="byteRangeString" value="http://..." valuetype="data" />
  </video>
  ...
``` ed to a client device, such as a personal computer,
COMBINED BINARY STRING FOR SIGNALING BYTE RANGE OF MEDIA FRAGMENTS IN ADAPTIVE STREAMING This application claims the benefit of U.S. Provisional Application No. 61/300,992, filed Feb. 3, 2010, entitled "Combined Binary String for Signaling Byte Range of Media Fragments in Adaptive Streaming," which application is hereby incorporated herein by reference.

TECHNICAL FIELD

The present invention relates generally to networking and, more particularly, to a system and method for providing adaptive media streaming.

BACKGROUND

Media streaming, such as streaming audio, video, images, text, and the like, is a popular use of the Internet. Generally, media streaming involves sending large amounts of data from a media server to a client device, such as a personal computer, a mobile device, a television, or the like. Each media stream may have many alternate media streams, such as audio alternatives for different languages, textual alternatives for closed captioning alternatives, etc. Furthermore, due to the large file size and differing network constraints of the client device, media alternatives for different bit rates may also be provided, thereby providing multiple bit rate switching for adaptive streaming. Such a technique allows the media server to provide and/or the client device to request the media fragments of the quality most suitable given the network constraints. For example, a client device connected via a broadband connection may access high quality media streams while a client device connected via a lower bandwidth connection may access lower quality media streams.

During adaptive streaming, the media stream is usually provided in chunks, or media fragments. For easy content management on the streaming media server side, storing all media fragments belonging to the same quality level audio/video alternative together as one file is one popular solution. In this solution, a text-based media description file contains separate descriptions with the time offsets of each media fragment contained in the single file, thereby allowing the use of standard HTTP servers. Including a separate text-based description for each media fragment for the media stream, however, may create a very large and unmanageable text file for media contents with reasonable durations and several video/audio (and/or other media types such as text or graphics) alternatives, which degrade the streaming performance, e.g. longer startup delay.

For example, considering one media content with 90 minutes duration, 7 video alternatives of different bit rates, 2 audio alternatives of different languages, and a media fragment size of 2 seconds each, then there are a total of (90 minutes×60 seconds/minute×7 video alternative×2 audio alternatives)/2 seconds/fragment, or 37,800 media fragments, each of which is individually textually defined in the media description file.

SUMMARY

These and other problems are generally solved or circumvented, and technical advantages are generally achieved, by preferred embodiments of the present invention which provides a system and method for transmitting and receiving acknowledgement information.

In accordance with an embodiment, a system and method for providing media streaming are provided. A media description file having a range string indicator is used to specify size offsets of a plurality of media fragments within a media file. The range string may be stored directly in the media description file or the media description file may contain an indicator specifying a file containing the range string.

In another embodiment, the media description file may also include a range unit specifying the size of the offsets in the range string.

In another embodiment, a range string containing offsets of fragments within a single media fragment is provided.

Other embodiments are also disclosed.

The foregoing has outlined rather broadly the features and technical advantages of some embodiments in order that the detailed description of the embodiments that follow may be better understood. Additional features and advantages of the embodiments will be described hereinafter which form the subject of the claims. It should be appreciated by those skilled in the art that the conception and specific embodiments disclosed may be readily utilized as a basis for modifying or designing other structures or processes for carrying out the same purposes of the embodiments described herein. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 2 is a snippet of a media description file in accordance with an embodiment;

DETAILED DESCRIPTION OF ILLUSTRATIVE EMBODIMENTS

The making and using of embodiments are discussed in detail below. It should be appreciated, however, that the present disclosure provides many applicable inventive concepts that can be embodied in a wide variety of specific contexts. The specific embodiments discussed are merely illustrative of specific ways to make and use an embodiment, and do not limit the scope of the invention.

Figure 1:
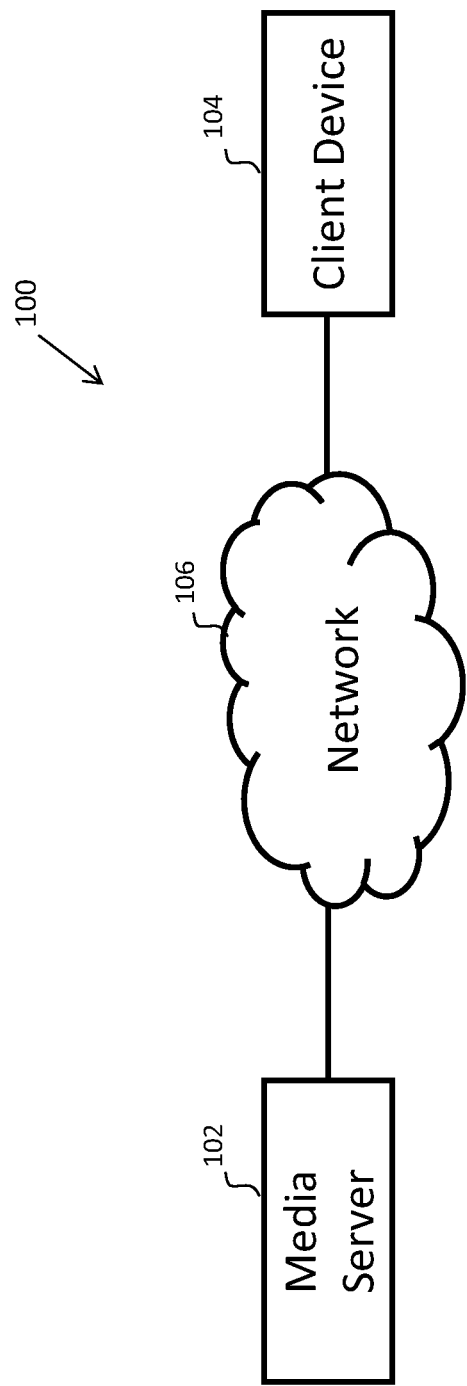
FIG. 1 is a network diagram in accordance with an embodiment.

Referring now to the figures, FIG. 1 illustrates a network environment 100 in accordance with an embodiment. The network environment 100 includes a media server 102 communicatively coupled to a client device 104 via a network 106. The network 106 may comprise any suitable type of network configured to communicate data between network elements, such as the media server 102 and the client device 104, and may include wired and/or wireless links, routers, switches, repeaters, and the like. The media server 102 comprises one or more computing elements suitable for storing media content, such as video, audio, images, text, and/or the like. The client device 104 comprises any suitable network device, such as a personal computer, laptop, mobile device, telephone, set-top box, gaming platform, and/or the like communicatively coupled, either wired or wireless, to the network 106.

In an embodiment, the network 106 comprises the Internet (a packet-based network) and the media server 102 comprises one or more HTTP servers. In this embodiment, the client device 104 requests media content, e.g., a movie, from the media server 102. The media server 102 retrieves the requested media content and transmits the media content to the client device 104 via the network 106. In this example in which the media content is a movie, the client 104 requests specific portions of the movie from the media server 102 using location (e.g., byte, word, or the like) offsets. Upon receipt of the portions of the movie, the client device 104 reassembles the received packets and plays the movie. In this manner, a movie is "streamed" over the Internet from the media server 102 to the client 104. A user (not shown) of the client device 104 controls (e.g., pause, play, rewind, etc.) playback of the movie on the client device 104.

In operation, the media server 102 provides to the client device 106 a media description file that provides metadata, such as the header information, encoding scheme, quality, fragment locations, and the like, of the media content to the client device 106. The client device 106 parses the media description file to request specific portions of the media content from the media server 102. Following along with the above example of a movie, the media server 102 provides to the client device 104 a media description file, such as a Synchronized Multimedia Integration Language (SMIL) text file, that indicates, among other things, the encoding scheme used to encode the movie and a quality (e.g., bitrate) of the movie, as well as fragment locations. Due to the size of the file, a movie may be broken into multiple fragments that may be individually retrieved by the media server 102. The fragment locations identify to the client device 104 the locations of these fragments within the media file and the client device 104 uses these locations to retrieve the separate fragments from the media server 102. In an embodiment, the fragment locations are size offsets within the media file, such as byte offsets. Other types of size offsets, e.g., 16-bit word offsets, 32-bit word offsets, 64-bit word offsets, or the like, may used in other embodiments.

FIG. 2 illustrates a snippet 200 that may be used in a media description file in accordance with an embodiment. The snippet 200 includes a "video" description block for a source file specified by the "src" parameter that specifies the location of the media file, such as a URL path. The "video" description block includes a "systemBitrate" parameter that indicates bit rate used for encoding, a "systemScreenSize" parameter that indicates screen size for which the media is formatted, and a "speed" parameter that indicates the relative playback speed. Also included in the "video" description block are the parameter definitions for "byteRangeString," which indicates the size offsets of the individual media fragments within the media file, and "byteRangeUnit," which indicate the size unit of the size offset values in the "byteRangeString" parameter.

The size of media files may vary greatly, and as such, the size of an integer required to specify a size offsets in the media file may also vary. As such, it may be desirable to allow different size of integer values to be used to specify a size offset in the media file. In an embodiment, the "byteRangeUnit" parameter is used to specify the size of the integer values contained in the "byteRangeString" parameter.

Figure 3A:
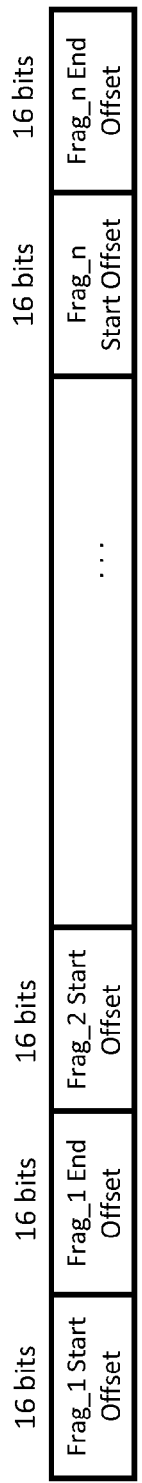
FIGS. 3a-3c are bit descriptions for a range value parameter in accordance with an embodiment.
Figure 3B:
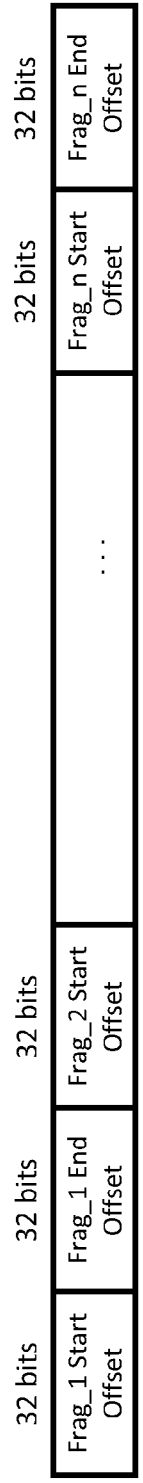
Figure 3C:
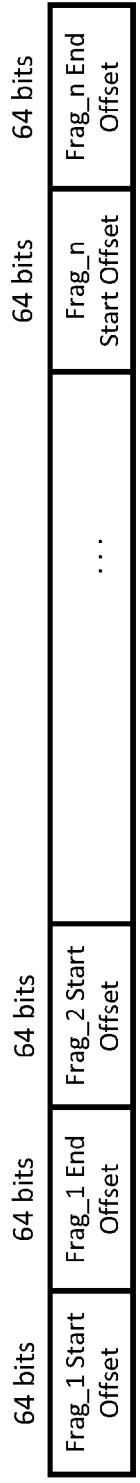

For example, as illustrated in FIG. 2, the "byteRangeUnit" may have a value of "16" to indicate 16-bit values for small media files whose sizes are below 64 kilo-bytes, "32" to indicate 32-bit values for medium media files whose sizes are between 64 kilo-bytes and 4 giga-bytes, and "64" to indicate 64-bit values for large media files with size over 4 giga-bytes. FIGS. 3a-3c illustrate a format of the parameter "byteRangeString" for 16-bit, 32-bit, and 64-bit integer values, respectively. In an embodiment, the "byteRangeString" is Base64 encoded, which represents binary data in an ASCII string format by translating the data into a radix-64 representation. Other formats, however, may be used. As illustrated by FIGS. 3a-3c, each offset is stored in a corresponding substring (labeled Frag_1 Start Offset, Frag_1 End Offset, Frag_2 Start Offset, . . . , Frag_n Start Offset, Frag_n End Offset).

Figure 4A:
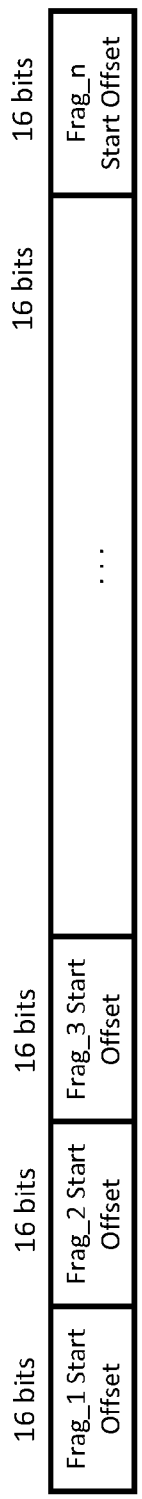
FIGS. 4a-4c are bit descriptions for a range value parameter in accordance with another embodiment.
Figure 4B:
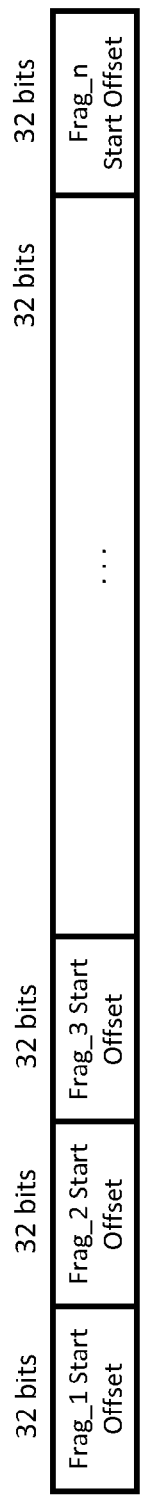
Figure 4C:
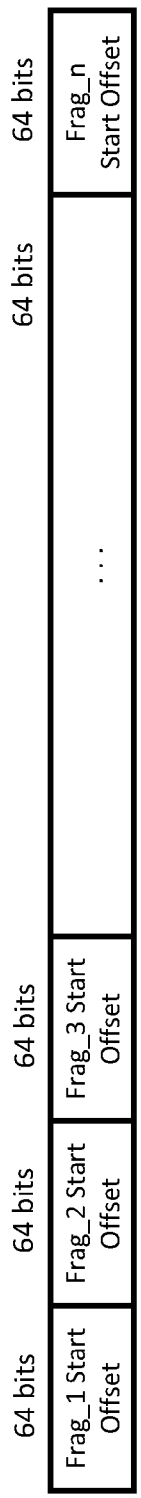

FIGS. 4a-4c illustrate another embodiment of a format of the parameter "byteRangeString" for 16-bit, 32-bit, and 64-bit integer values, respectively. While the embodiment illustrated in FIGS. 3a-3c utilize pairs of offsets (start/stop offset pairs) to identify each fragment, an alternative embodiment illustrated in FIGS. 4a-4c utilizes a single start value for each fragment. As illustrated by FIGS. 4a-4c, each offset is stored in a corresponding substring (labeled Frag_1 Start Offset, Frag_2 Start Offset, Frag_3 Start Offset, . . . , Frag_n Start Offset). The stop value for each fragment may be derived from the start offset value for the subsequent fragment, and the stop value for the last fragment will be the end of the media file. However, this alternative embodiment does not apply to signaling of the byte ranges for media data inside media fragments, such as a media fragment header, as described below.

Figure 5:
FIG. 5 is a snippet of a media description file in accordance with another embodiment.

FIG. 5 illustrates a snippet 500 that may be used in a media description file in accordance with another embodiment. The snippet 500 includes a "byteRangeInline" parameter in addition to those parameters discussed above with reference to FIG. 2. In some embodiments, it may be desirable to store the value of the "byteRangeString" parameter in a separate file. The "byteRangeInline" parameter allows the value of the "byteRangeString" parameter to be stored inline (within the media description file as discussed above with respect to FIG. 2) or in a separate file. The value of the "byteRangeInline" parameter may be "True"/"False," "Inline"/"File," "0"/"1," or any other suitable identifier.

In an embodiment in which the "byteRangeInline" parameter indicates that the value of the "byteRangeString" is stored in a separate file, the value of the "byteRangeString" parameter in the media description file may be the file name (e.g., "http:\\www. . . . "). Upon parsing by the client device 104 of the media description file, the client device 104 retrieves the file specified by the "byteRangeString" parameter. This alternative may provide smaller main media description files for faster start-up, as the supplementary binary string files can be loaded on demand.

Otherwise, if the "byteRangeInline" parameter indicates that the value of the "byteRangeString" parameter is stored inline, then the value of the "byteRangeString" parameter contains the actual fragment offset values as discussed above in the embodiment of FIG. 2. This embodiment requires fewer files to manage on the media server.

Figure 6:
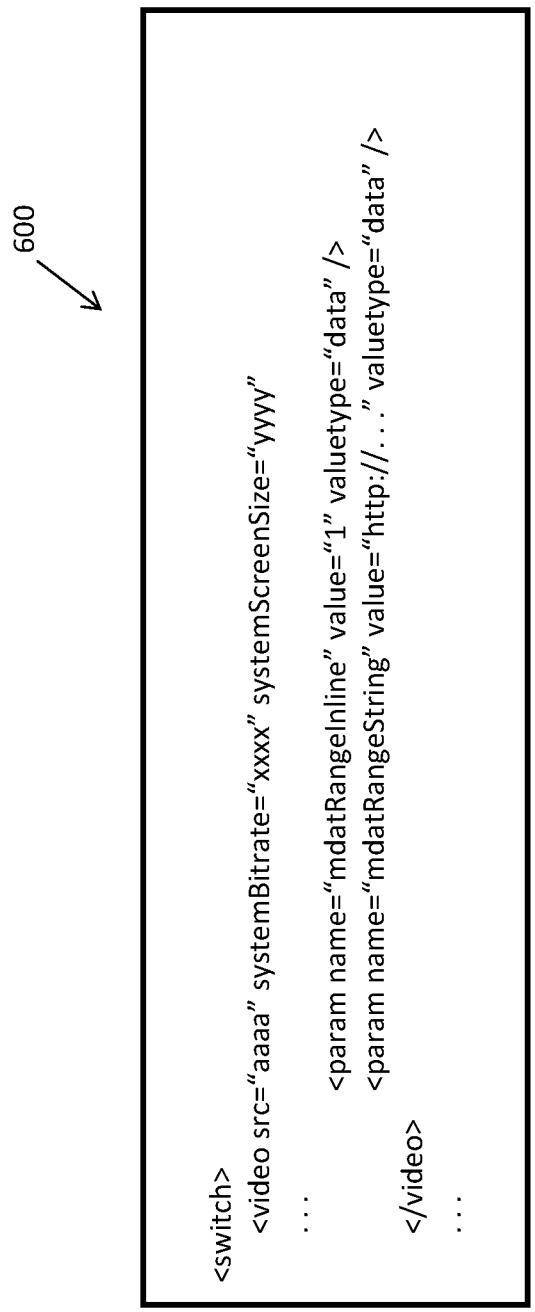
FIG. 6 is a snippet of a media description file in accordance with yet another embodiment.

FIG. 6 illustrates a snippet 600 of a media description file that identifies offset ranges within a media fragment in accordance with an embodiment. In addition to the embodiments discussed above that provides the offsets of whole media fragments, embodiments such as that illustrated in FIG. 6 may be used to provide offsets within single media fragments. In some cases, such as media fragment based transcoding and using media fragments to support different delivery schemes, it may be desirable to extract the media data (in "mdat" box(es)) from the corresponding media fragments.

Figure 7A:
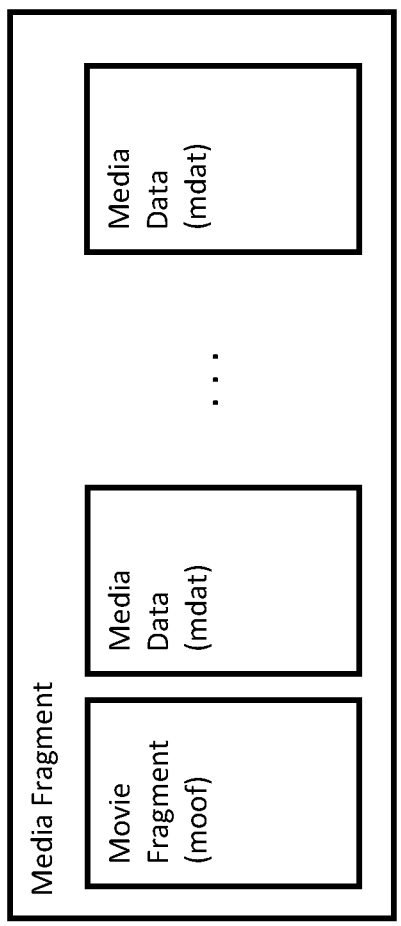
FIG. 7a illustrates a media fragment box in accordance with an embodiment.

The ISO Base Media File Format (ISO 14496 Part 12) specifies the format of media fragment, as stored on the media server 102 and provided to the client device 104, as illustrated in FIG. 7a. Each media fragment box, may have one or multiple media data ("mdat") boxes inside, wherein the mdat box contains the actual media for presentation.

Referring back to FIG. 6, an example of a media description snippet to signal the offset ranges of "mdat" boxes within the media fragment is shown. The use of the "mdatByteRangeInline" parameter and the "mdatByteRangeString" parameter are similar to the "byteRangeInline" parameter and the "byteRangeString" parameter, respectively, discussed above with respect to FIG. 2, except the values are related to the mdat box as opposed to the fragment.

Figure 7B:
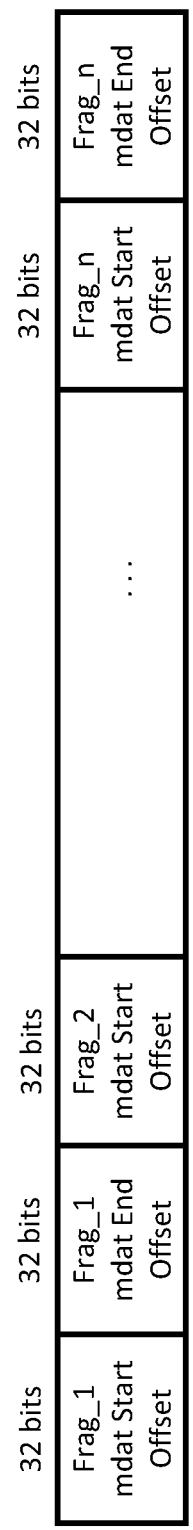
FIG. 7b illustrates bit descriptions for an "mdat" range value parameter in accordance with an embodiment.

The offset range of the media data starts with the offset of the first "mdat" box and ends with the last offset of the last "mdat" box, where in the offsets are relative to the starting point of each media fragment. In practice, the size of each media fragment is unlikely to exceed the 4 giga-byte limit, thus a 64-bit byte range is generally may not be necessary. As a result, the embodiment illustrated in FIG. 6 does not include a corresponding parameter for "byteRangeUnit." If desired, however, other embodiments may utilize an "mdatByteRangeUnit" parameter in a manner similar to the "byteRangeUnit" discussed above with respect to FIG. 2 to specify the size of the values specified by the "byteRangeString" (inline or in a separate file). An embodiment of a format of a combined binary string for specifying the "mdat" offset ranges is illustrated in FIG. 7b.

One of ordinary skill in the art will appreciate that embodiments such as those disclosed herein provides offset values (e.g., byte offsets) of all or a continuous subset of media fragments belonging to the same alternative (e.g., an video alternative, an audio alternative, an video/audio alternative, or an video/audio/text alternative) as a single binary string, without separately describing each media fragment, thus possibly reducing the media description size and improving the streaming performance.

Figure 8:
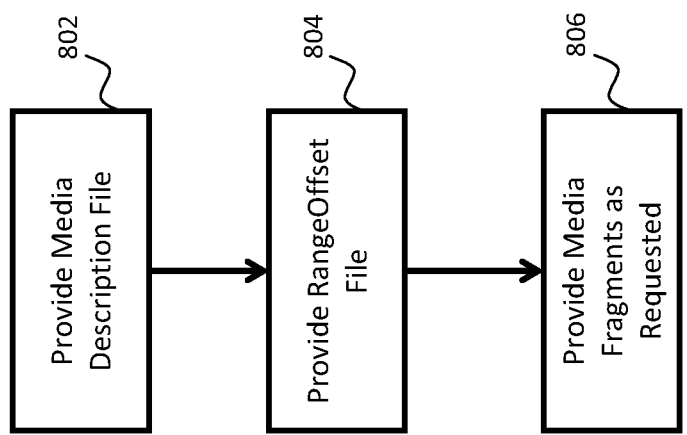
FIG. 8 illustrates a process that may be performed by a media server to stream media in accordance with an embodiment.

FIG. 8 is a process diagram illustrating a process that may be performed by the media server 102 in accordance with an embodiment. The process begins in step 802, wherein the media server 102 provides a media description file to, e.g., the client device 104. Step 802 may be performed, for example, as a result of a specific request received from the client device 104 and/or another device, such as one content provider requesting that the media server 102 provide the media description file (and media file) to the client device 104.

In some embodiments, such as the embodiment discussed above with reference to FIG. 5 in which the range string is stored in a separate file, the media server 102 provides the range string file to the client device 104, as illustrated in step 804. The media server 102 may perform this step automatically or upon request from the client device 104 or another device.

Thereafter, as illustrated in step 806, the media server 102 provides the media fragments (or portions of the media fragments) as requested.

Figure 9:
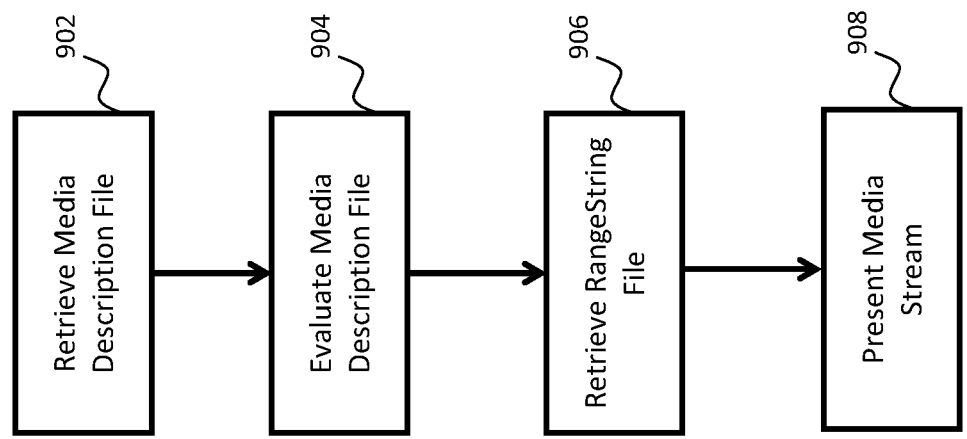
FIG. 9 illustrates a process that may be performed by a client device to stream media in accordance with an embodiment.

FIG. 9 is a process diagram illustrating a process that may be performed by the client device 104 in accordance with an embodiment. The process begins in step 902, wherein the client device 104 requests a media description file corresponding to a particular media file. The request may be initiated by, for example, clicking on a link of a web page. Upon receipt of the media description file, the client device 104 evaluates the media description file in step 904 and requests the corresponding media fragments (or portions of media fragments) to present to the user in step 906.

Optionally, if the media description file indicates that the range string and/or the mdat range string is stored in a different file, the client device may retrieve the file the containing the range string and/or the mdat range string as indicated in step 908.

Figure 10:
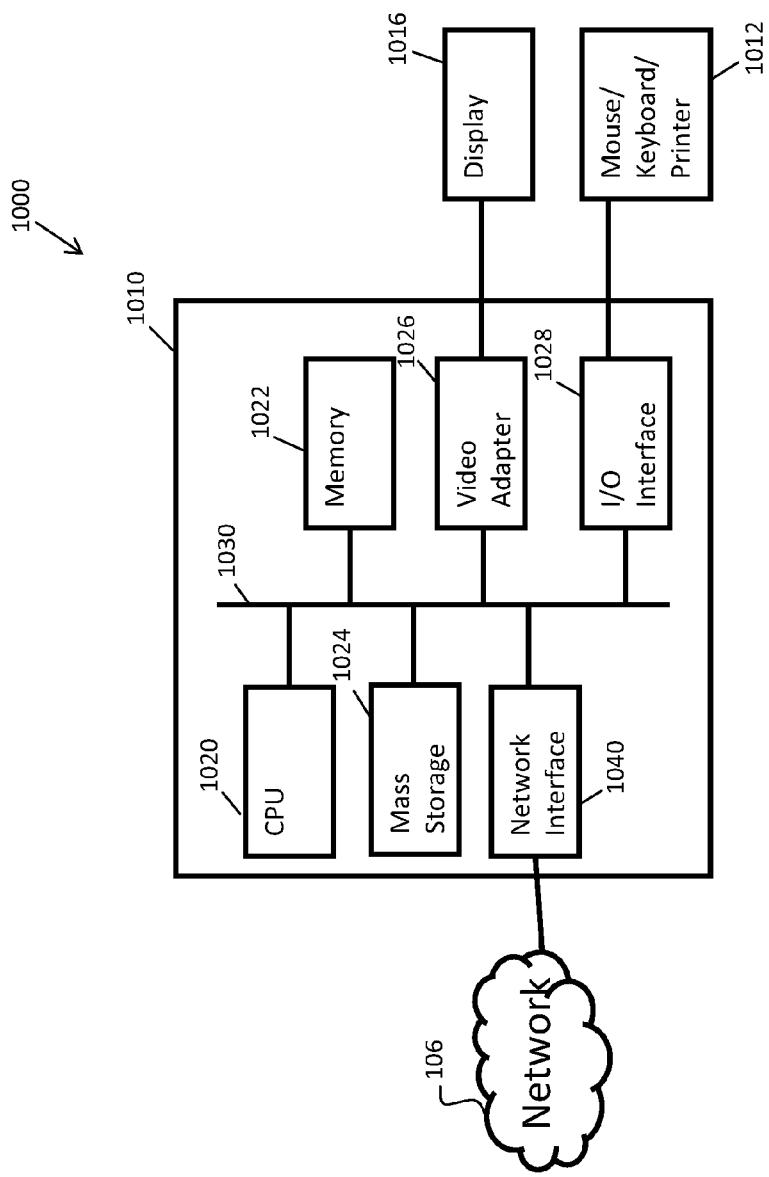
FIG. 10 illustrates a computing platform that may be used for the media server and/or the client device in accordance with an embodiment.

Referring now to FIG. 10, a block diagram of a processing system 1000 that may be used for the media server 102 and/or the client device 104 is provided in accordance with an embodiment of the present invention. The processing system 1000 may comprise a processing unit 1010 equipped with one or more input/output devices 1012, such as a mouse, a keyboard, printer, or the like, and a display 1016. The processing unit 1010 may include a central processing unit (CPU) 1020, memory 1022, a mass storage device 1024, a video adapter 1026, and an I/O interface 1028 connected to a bus 1030.

The bus 1030 may be one or more of any type of several bus architectures including a memory bus or memory controller, a peripheral bus, video bus, or the like. The CPU 1020 may comprise any type of electronic data processor. The memory 1022 may comprise any type of system memory such as static random access memory (SRAM), dynamic random access memory (DRAM), synchronous DRAM (SDRAM), read-only memory (ROM), a combination thereof, or the like. In an embodiment, the memory 1022 may include ROM for use at boot-up, and DRAM for data storage for use while executing programs.

The mass storage device 1024 may comprise any type of storage device configured to store data, programs, and other information and to make the data, programs, and other information accessible via the bus 1030. The mass storage device 1024 may comprise, for example, one or more of a hard disk drive, a magnetic disk drive, an optical disk drive, or the like.

The video adapter 1026 and the I/O interface 1028 provide interfaces to couple external input and output devices to the processing unit 1010. As illustrated in FIG. 10, examples of input and output devices include the display 1016 coupled to the video adapter 1026 and the mouse/keyboard/printer 1012 coupled to the I/O interface 1028. Other devices may be coupled to the processing unit 1010, and additional or fewer interface cards may be utilized. For example, a serial interface card (not shown) may be used to provide a serial interface for a printer.

The processing unit 1010 also preferably includes a network interface 1040, which may be a wired link, such as an Ethernet cable or the like, and/or a wireless link. The network interface 1040 allows the processing unit 1010 to communicate with remote units via the network 134. In an embodiment, the processing unit 1010 is coupled to a local-area network or a wide-area network to provide communications to remote devices, such as other processing units, the Internet, remote storage facilities, or the like.

It should be noted that the processing system 1000 may include other components. For example, the processing system 1000 may include power supplies, cables, a motherboard, removable storage media, cases, and the like. These other components, although not shown, are considered part of the processing system 1000.

Although embodiments and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   storing, by a media server, a media content file comprising a plurality of media fragments;
   storing, by the media server, a plurality of offset values, wherein the plurality offset values correspond to first locations of the plurality of media fragments in the media content file, and wherein the plurality of offset values is encoded in a string format and stored as a single string of offset values separate from the media content file, wherein the single string of offset values comprises a plurality of substrings, wherein each of the plurality of substrings stores one of the plurality of offset values concatenated to form the single string of offset values, and wherein each of the plurality of substrings includes a number of bits storing one of the plurality of offset values concatenated to the number of other bits storing another one of the plurality of offset values;
   receiving, by the media server, a request for a media description file corresponding to the media content file, wherein the media description file comprises a range unit indicator, the range unit indicator indicating a size of the number of bits;
   providing, by the media server, the plurality of offset values in accordance with the request for the media description file, wherein providing the plurality of offset values comprises providing the plurality of offset values in the single string of offset values; and
   providing, by the media server, at least a subset of the plurality of media fragments in accordance with a request for the subset of the plurality of media fragments.

2. The method of claim 1, wherein each of the plurality of offset values is a size offset.

3. The method of claim 2, wherein the size offset is a byte offset.

4. The method of claim 2, wherein the size offset is relative to a beginning of the media content file.

5. The method of claim 1, wherein the single string of offset values is stored in the media description file.

6. The method of claim 1, wherein the single string of offset values of is stored in a file separate from the media description file.

7. The method of claim 1, further comprising providing, by the media server, the range unit indicator.

8. The method of claim 1, wherein each of first locations comprises a start location and a stop location of a media fragment in the plurality of media fragments.

9. The method of claim 1, further comprising providing a plurality of second locations, each of the plurality of second locations corresponding to locations within a single media fragment.

10. A method comprising:
    requesting, by a client device, a media description file corresponding to a media content file, where the media content file comprises a plurality of media fragments;
    receiving, by the client device, the media description file, the media description file providing a plurality of offset values, wherein the plurality offset values correspond to locations of the plurality of media fragments in the media content file, and wherein the plurality of offset values is provided in a string format stored as a single binary string of offset values separate from the media content file, wherein the single binary string of offset values comprises a plurality of substrings, wherein each of the plurality of substrings stores one of the plurality of offset values concatenated to form the single binary string of offset values, and wherein the media description file comprises a range inline indicator, the range inline indicator indicating whether the plurality of offset values is stored in the media description file or a different file;
    evaluating, by the client device, the media description file to determine offset values corresponding to the locations of the plurality of media fragments; and
    retrieving, by the client device, a first media fragment of the plurality of media fragments by providing a first offset value corresponding to a first location of the first media fragment to a media server.

11. The method of claim 10, wherein the first offset value is a size offset.

12. The method of claim 11, wherein the size offset is a byte offset.

13. The method of claim 11, wherein the size offset is relative to a beginning of the media content file.

14. The method of claim 10, wherein the single binary string of offset values is stored in the media description file.

15. The method of claim 10, further comprising providing a range unit, the range unit indicating a size of each offset value in the plurality of offset values in the string format.

16. The method of claim 10, wherein each of the plurality of offset values comprises a start location and a stop location.

17. The method of claim 10, further comprising providing a plurality of additional locations corresponding to locations within a single media fragment.

18. A media server comprising:
    a non-transitory computer-readable medium;
    a media content file stored on the non-transitory computer-readable medium, wherein the media content file comprises a plurality of media fragments;
    a media description file stored on the non-transitory computer-readable medium, wherein the media description file corresponds to the media content file; and
    a plurality of offset values encoded in a string format and stored on the non-transitory computer-readable medium as a single string of offset values and provided by the media description file, wherein the plurality offset values indicates locations of the plurality of media fragments in the media content file, wherein the plurality of offset values is stored on the non-transitory computer-readable medium in a separate file than the media content file, wherein the single string of offset values comprises a plurality of substrings, wherein each of the plurality of substrings stores one of the plurality of offset values, wherein the plurality of substrings are concatenated to form the single string of offset values, wherein each of the plurality of substrings includes a number of bits storing one of the plurality of offset values concatenated to the number of other bits storing another one of the plurality of offset values, and wherein the media description file comprises a range unit indicator, the range unit indicator indicating a size of the number of bits.

19. The media server of claim 18, wherein the media description file comprises a location of the separate file, the separate file containing the plurality of offset values in the string format.

20. The media server of claim 18, wherein the media description files comprises a range inline indicator, the range inline indicator indicating whether the plurality of offset values is stored in the media description file or a different file.

21. The media server of claim 18, wherein the media description files comprises a media data (mdat) string of offset values, the mdat string of offset values indicating a plurality of mdat location offsets, the plurality of mdat location offsets indicating an offset within a media fragment.

22. The media server of claim 18, wherein the media description files comprises a media data (mdat) range inline indicator, the mdat range inline indicator indicating whether mdat location offsets are specified in the media description file or in a different file.

23. The media server of claim 18, wherein each of the plurality of substrings is 16-bit, 32-bit, or 64-bit value storing one of the plurality of offset values concatenated to another 16-bit, 32-bit, or 64-bit value storing another one of the plurality of offset values.

* * * * *